June 15, 1965 R. V. GILLESPIE 3,189,230
SEEDING DEVICE
Filed March 20, 1962 2 Sheets-Sheet 1
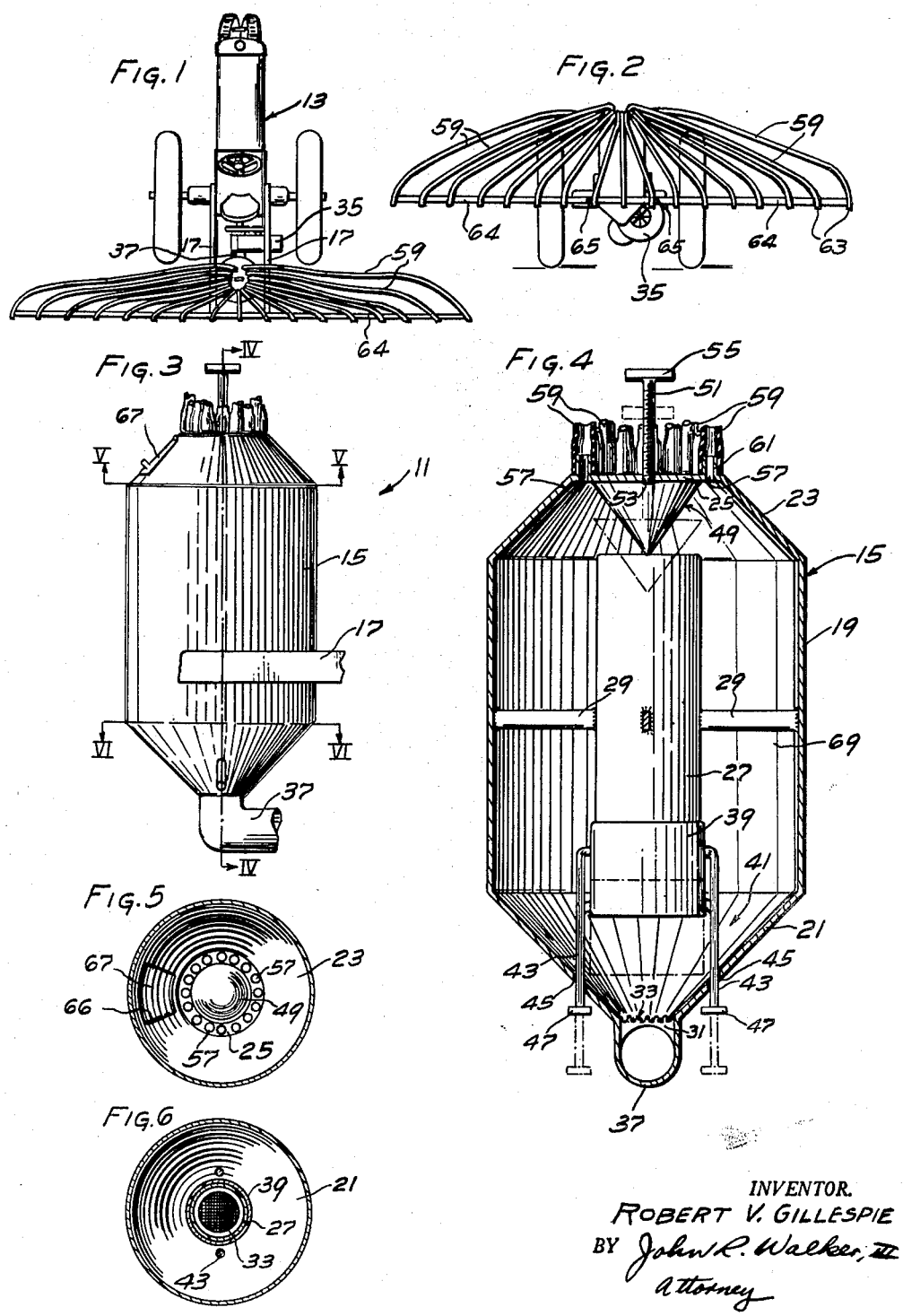
INVENTOR.
ROBERT V. GILLESPIE
BY John R. Walker, II
Attorney June 15, 1965     R. V. GILLESPIE     3,189,230
SEEDING DEVICE
Filed March 20, 1962     2 Sheets-Sheet 2
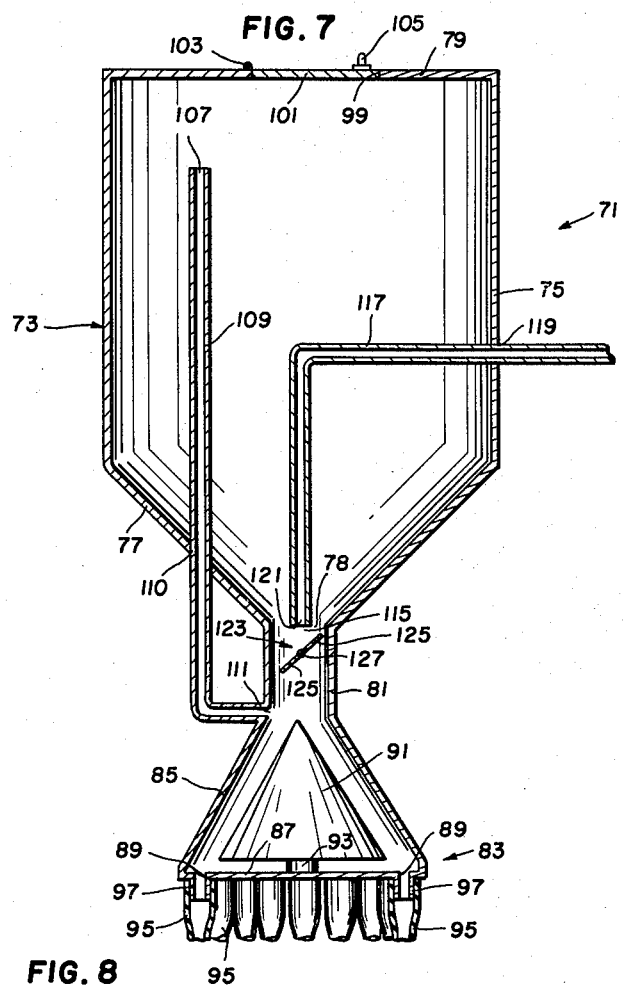
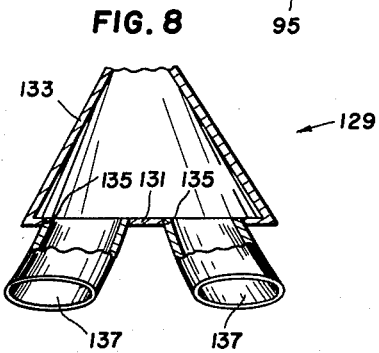
INVENTOR.
ROBERT V. GILLESPIE
BY John R. Walker, III
Attorney United States Patent Office 3,189,230
Patented June 15, 1965

3,189,230
SEEDING DEVICE
Robert V. Gillespie, 506 E. 5th St., Metropolis, Ill.
Filed Mar. 20, 1962, Ser. No. 181,145
4 Claims. (Cl. 222—193)

This invention relates to a seeding device adapted to be mounted on a vehicle as a tractor or the like for movement over the ground to deposit seeds in laterally spaced rows. This is a continuation-in-part of my co-pending application, Serial No. 85,815, filed January 30, 1961, now abandoned.

There have been various types of seeders heretofore contemplated, and these generally fall into three different categories, as follows: the rotary broadcast seeder, the grain drill, and the corn or drill planter. The present invention is directed towards replacing both the rotary broadcast seeder and the grain drill, and with some modification it can replace the drill planter. In addition, the present invention is directed towards providing a seeding device offering advantages over heretofore known seeders, and in particular offering advantages over the above three mentioned types in the following manner:

In comparison with the rotary broadcast seeder, the present invention is more advantageous since it will plant seeds in a row, which is always more desirable than the broadcast method.

Relative to the grain drill, it can only cover a width of ground equal to the length of the seed hopper, while the present invention can cover many times that area. Where the grain drill must have metering apparatus for each row, the present invention has two controls for an unlimited number of rows. In addition, with the present invention a conventional disc harrow can be used to open the seed trenches in the soil by pulling it behind the same tractor-mounted seeder and, by extending the flexible seed tubes to the harrow discs, blow the seed into each trench. The present invention does not depend upon small openings to meter the seeds, while conventional grain drills depend upon the size of the hole for each row to do this. The present invention is simpler and less expensive than grain drills, yet can do the same job.

Relative to the drill planter, each row requires a separate seed hopper and each hopper has its individual planter plate, whereas the present invention can be adapted to use one seed hopper and one plate to plant several rows of corn.

Thus, one of the objects of the present invention is to provide a seeder offering many advantages over conventional seeders.

A further object is to provide such a seeder which is simple in construction and economical to manufacture, yet which is highly efficient.

A further object is to provide such a seeder which is provided with means for accurately and easily changing the amount of seeds deposited in the rows.

A further object is to provide a seeder which is adapted to plant simultaneously a large number of rows, thereby saving labor and time.

A further object is to provide a unique means for feeding the seeds by forced air from a central hopper to a plurality of flexible tubes which terminate in laterally spaced open ends for directing the seeds into laterally spaced rows.

A further object is to provide an alternate form of the seeder which is inverted relative to the principal embodiment so that the seed exits from adjacent the bottom thereof rather than from the top.

A further object is to provide another form of the seeder in which the seed also exits from adjacent the bottom thereof, but the seed is sprayed out from nozzles.

A further object is generally to improve the design and construction of seeders.

The means by which the foregoing and other objects of the present invention are accomplished and the manner of their accomplishment will be readily understood from the following specification upon reference to the accompanying drawings, in which:

FIG. 1 is a top plan view of the seeder of the present invention shown in use with a tractor.

FIG. 2 is a rear elevational view thereof.

FIG. 3 is an enlarged fragmentary side elevational view showing the seed hopper portion of the present invention.

FIG. 4 is a further enlarged cross-sectional view taken as on the line IV—IV of FIG. 3, with parts being shown in elevation for purposes of clarity.

FIG. 5 is a sectional view taken as on the line V—V of FIG. 3.

FIG. 6 is a sectional view taken as on the line VI—VI of FIG. 3.

FIG. 7 is a view similar to FIG. 4 of an alternate form of the seeder.

FIG. 8 is a fragmentary view of the lower part of another form of the seeder, with parts being sectionalized and broken away for purposes of illustration.

Referring now to the drawings in which the various parts are indicated by numerals, the seeder 11 of the present invention is adapted to be mounted on the rearward part of a vehicle, as the tractor 13, shown in FIGS. 1 and 2. Seeder 11 includes an enclosed airtight hopper 15 which is supported in an upright position from tractor 13 as by suitable supporting members 17 which are attached to the tractor and extend rearwardly therefrom where they are respectively attached to the hopper on opposite sides thereof.

Hopper 15 includes a substantially cylindrical side wall 19, a frusto-conical bottom 21 downwardly and inwardly sloping from the lower end of the side wall, a frusto-conical neck portion 23 upwardly and inwardly sloping from the upper end of the side wall, and a circular top 25 attached to the neck portion adjacent the upper end thereof.

A vertical seed-air mixture pipe 27 is supported centrally in the interior of hopper 15 by suitable means as braces 29 attached to and extending between the exterior of the pipe and the interior of side wall 19. Pipe 27 is concentric with hopper 15, and the open upper and lower ends thereof are respectively spaced from top 25 and bottom 21.

Bottom 21 is provided with a central inlet opening 31 below pipe 27 and concentric therewith. A perforated seed retainer, which is formed of screen 33 or the like, is mounted across inlet opening 31, as best seen in FIG. 4. Gas under pressure is supplied to hopper 15 through inlet opening 31 so that it blows upwardly through pipe 27. This gas is preferably air, although it may be other gases, as for example the exhaust gas from the tractor, without departing from the spirit and scope of the present invention. In the embodiment shown, air is supplied from air blower 35, of usual construction, mounted on tractor 13 with the air being conducted to hopper 15 through a conduit 37 connected between air blower 35 and inlet opening 31.

A collar 39 is slidably mounted for upward and downward movement on pipe 27 adjacent the lower end of the pipe and extends downwardly beyond the pipe to establish a substantially annular entrance-way 41 between the lower edge of collar 39 and bottom 23 for a purpose later to be described. A pair of rods 43 are attached to collar 39 on the opposite sides thereof and extend downwardly therefrom respectively through holes 45 in bottom 21. Rods 43 extend downwardly beyond bottom 21 and respectively terminate in handles 47 so that means on the exterior of hopper 15 is provided for adjusting the position of collar 39 to adjust the size of annular entrance-way 41. An uppermost position of collar 39 is shown in solid lines in FIG. 4, and a lower position is shown in broken lines in this figure. Collar 39 is frictionally mounted on pipe 27 so that it will remain fixed against accidental movement after being moved into a desired position.

A conically shaped deflector 49 is mounted above the upper end of pipe 27 and adapted to be adjusted into positions in which the deflector extends downwardly into the upper end of the pipe. The mounting means for deflector 49 is preferably a threaded shaft 51 fixedly attached centrally to the upper part of the deflector and extending through a central threaded aperture 53 in top 25 and upwardly therebeyond. A handle 55 is fixedly attached to shaft 51 adjacent the upper end thereof so that the shaft may be turned to carry the deflector 49 from an uppermost position, shown in FIG. 4, to lower positions, with one of the lower positions being shown in broken lines in this figure. It will be understood that as shaft 51 is turned, the deflector 49 rotates therewith.

A plurality of circumferentially spaced apertures 57 are provided in top 25, and are preferably located outwardly of deflector 49 when the deflector is in the uppermost position.

A plurality of flexible tubes 59 are coupled to hopper 15 and respectively lead from apertures 57. The connection between each of the tubes and hopper 15 is preferably by an upstanding hollow cylindrical piece 61 attached to top 25 in surrounding relationship with an aperture 57 and extending upwardly therefrom and with the end of a tube 59 slipped thereover. The opposite ends of tubes 59 from apertures 57 terminate in open ends 63 which are downwardly directed and held in laterally spaced relationship by means of booms 64 to which the tubes are attached so that the seeds are deposited in laterally spaced rows. Booms 64 are preferably pivotally mounted from supporting members 17 at pivot points 65 so that the booms are adapted to be raised upwardly when not in use.

In using the seeder 11 of the present invention, the seed is first introduced into hopper 15 through an opening 66 in neck portion 23, which opening is normally closed by a door 67. The seed introduced into hopper 15 is contained in the space 69 between pipe 27 and the hopper, and the seed moves downwardly through annular entrance-way 41 onto screen 33, whereupon the forced air entering through conduit 37 blows the seed upwardly through pipe 27 and against deflector 49, which deflects the seeds through apertures 57. The seeds are then carried by the forced air through flexible tubes 59 and out the ends of the tubes into laterally spaced rows. It will be understood that when deflector 49 is adjusted downwardly towards pipe 27 the flow of seeds through the flexible tubes 59 will be reduced, and as the deflector is moved upwardly the amount of seeds flowing through the flexible tubes is increased. This is because, as will be understood, as the deflector is moved downwardly the seeds are deflected outwardly in circles of increasing diameter relative to top 25 so that the stream of seeds moves outwardly relative to the apertures 57.

Adjustable collar 39 is actually a primary seed control. In other words, it is to be adjusted for the type of seeds used, such as wheat, rye, clover, grass, etc. whereas adjustable deflector 49 is a secondary control. Deflector 49 is used to set the rate of seeding of the selected kind of seed, and provides a very accurate and easy adjustment. Deflector 49 not only deflects the seed but it also controls the amount of seed entering pipe 27. This is accomplished since, as the deflector is moved downwardly, the air flow through the pipe 27 is restricted and, as the deflector is moved upwardly, the air flow is increased, which gives a very sensitive control.

Referring now to the alternate form of the seeder of the present invention which is indicated in general by the numeral 71 and shown in FIG. 7, the seeder 71 is adapted to be mounted on the rearward part of a vehicle, as previously described for the principal embodiment. Seeder 71 includes an enclosed airtight hopper 73 which is supported in an upright position in the same manner as heretofore described for the principal embodiment. Seeder 71 operates on a principle similar to the principal embodiment, but is inverted relative thereto, which will be better understood in the description to follow of seeder 71.

Hopper 73 includes a substantially cylindrical side wall 75, an inverted frusto-conical bottom 77 downwardly and inwardly sloping from the lower end of the side wall to a central opening 78, and a flat circular top 79 integrally attached adjacent the upper end of side wall 75.

A vertical seed-air mixture pipe 81, which is smaller in diameter than hopper 73, is joined to frusto-conical bottom 77 and leads downwardly to a seed distributing portion 83. In other words, pipe 81 is concentric with hopper 73 with the open upper end of the pipe being in communication with the interior of the hopper through central opening 78 and the lower open end of the pipe communicating with the upper end of the seed distributing portion 83. Seed distributing portion 83 includes a conical housing 85 which is joined adjacent its upper end to the lower end of pipe 81 and is flared downwardly and outwardly therefrom. Conical housing 85 additionally includes a circular bottom 87 having a plurality of circumferentially spaced apertures 89 therethrough.

A conically shaped deflector 91 is mounted in conical housing 85 and spaced therefrom. The mounting means for deflector 91 is any suitable means such as a stud 93 supporting the deflector 91 from bottom 87. Deflector 91 and apertures 89 are preferably arranged so that the apertures are spaced outwardly from the deflector whereby the seeds will be directed by the deflector through the apertures in a manner similar to the operation of the principal embodiment.

A plurality of flexible tubes 95, corresponding to flexible tubes 59 in the principal embodiment, are coupled to conical housing 85 and respectively lead from apertures 89. The connection between each of the tubes and conical housing 85 is preferably by a hollow cylindrical piece 97 attached to circular bottom 87 in surrounding relationship with an aperture 89 and extending downwardly therefrom and with the end of a tube 95 slipped thereover. The remaining portions of the tube 95, not shown, are the same as in the principal embodiment and have the same related parts to direct the seeds into laterally spaced rows.

An opening 99 is provided in top 79 and is normally tightly closed against the entrance of air by means of a door 101 having hinges 103 and a handle 105. Thus, means is provided for introducing the seed, not shown, into the interior of hopper 73. The hopper 73 can be filled to any desired height by the seed so long as it is not filled above the open upper end 107 of by-pass pipe 109, which pipe leads downwardly through an aperture 110 in hopper 73 to a place 111 adjacent the lower end of pipe 81 where it is in communication with the interior of pipe 81 and housing 85. It will be understood that the bottom 77 of hopper 73 funnels the seed into an area 115 adjacent the upper end of pipe 81.

A conduit 117, corresponding to conduit 37, leads from a gas supply means in the same manner as in the principal embodiment, through an aperture 119 in side wall 75 to the center of hopper 73 and thence depends downwardly along the vertical center line of hopper 73 and terminates at an opening 121 adjacent area 115 so that the gas is directed downwardly through pipe 81, which will cause a mixture of the gas and the seed to flow downwardly through the pipe and be deflected by deflector 91 out through the apertures 89 and into the rows, in a manner as previously described relative to the principal embodiment.

A valve 123 is provided in pipe 81 and is preferably in the form of a butterfly valve including vanes 125 fixedly mounted on a turnable shaft 127, so that the valve can be rotated from open positions, one of which is illustrated in FIG. 7, to a closed position in which the vanes 125 extend horizontally and cut off the flow of the seeds and the gas through pipe 81. It will be understood that by this means the amount of seed deposited in the rows can be controlled. Also, it will be understood that when the valve 123 is closed, the gas will be forced up through the seed and will enter the upper end 107 of by-pass pipe 109 and will flow therethrough by-passing the valve 123.

The similarity of the alternate form shown in FIG. 7 to the principal embodiment can be readily appreciated from the foregoing description. Thus, it will be noted that the same general principle is applied in seeder 71 as in seeder 11, but instead of the seed being blown upwardly as in seeder 11, the seed is blown downwardly. The valve 123 of seeder 71 corresponds to the valving action of deflector 49 when the deflector 49 is moved upwardly or downwardly to control the flow of air and seed through pipe 27 of seeder 11. In other words, in the principal embodiment the deflector 49 performs two functions i.e. that of deflecting and valving, whereas in the seeder 71 there is a separate valve and a separate deflector. Also, it will be understood that pipe 81 corresponds to pipe 27; conduit 117 corresponds to conduit 37; and area 115 corresponds to the area adjacent screen 33 to which the seed is funneled in the principal embodiment. In addition, the similarities of the seed distributing portions of the two devices are obvious.

In FIG. 8 is shown still another form of the seeder which is indicated in general as at 129 and which is similar to seeder 71 except that there is no deflector 91 and the bottom 131 of conical housing 133 is provided with a pair of large apertures 135. Also, a pair of nozzles 137 are respectively fixedly attached to bottom 131 and extend downwardly and outwardly from apertures 135. The remainder of seeder 129, other than the seed distribution portion hereinabove described, is the same as the seeder 71 so that the seed is blown downwardly by the gas through apertures 135 whereby the seed is spread on the ground rather than being deposited in individual rows. The amount of seed, of course, is controlled by a valve means, not shown, like that of seeder 71.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. A seeding device for mounting on a tractor and the like comprising an enclosed hopper including a substantially cylindrical side wall, an inverted frusto-conical bottom having a central opening therein, said bottom sloping downwardly and inwardly from said side wall to said opening, a pipe having open upper and lower ends, said pipe being joined to said frusto-conical bottom adjacent said opening with said upper end of said pipe being in communication with the interior of said hopper through said opening, a frusto-conically shaped housing in communication with the lower end of said pipe and extending outwardly and downwardly therefrom, said housing including a circular bottom having at least one aperture therein, door means in said hopper for introducing seeds into said hopper, gas supply means for supplying gas under pressure, conduit means leading from said gas supply means into the interior of said hopper and directed downwardly through said pipe to blow seeds therethrough into said frusto-conical housing and through said aperture, valve means in said pipe operable between open and closed positions for controlling the flow of seeds and gas through said pipe, and by-pass pipe means leading from the interior of said hopper to a place in said seeding device downstream of said valve means for by-passing the gas when said valve means is closed.

2. A seeding device for mounting on a tractor and the like comprising an enclosed hopper including a substantially cylindrical side wall, an inverted frusto-conical bottom having a central opening therein, said bottom sloping downwardly and inwardly from said side wall to said opening, a pipe having open upper and lower ends, said pipe being joined to said frusto-conical bottom adjacent said opening with said upper end of said pipe being in communication with the interior of said hopper through said opening, a frusto-conically shaped housing in communication with the lower end of said pipe and extending outwardly and downwardly therefrom, said housing including a circular bottom having a plurality of apertures therein, door means in said hopper for introducing seeds into said hopper, gas supply means for supplying gas under pressure, conduit means leading from said gas supply means into the interior of said hopper and directed downwardly through said pipe to blow seeds therethrough into said frusto-conical housing, a conically shaped deflector mounted in said frusto-conical housing and arranged to deflect seeds from said pipe into said apertures, a plurality of flexible tubes leading from said apertures and terminating in laterally spaced open ends for directing the seeds into laterally spaced rows, valve means in said pipe operable between open and closed positions for controlling the flow of seeds and gas through said pipe, and by-pass means leading from the interior of said hopper to a place in said seeding device downstream of said valve means for by-passing the gas when said valve means is closed.

3. A seeding device for mounting on a tractor and the like comprising an enclosed hopper including a substantially cylindrical side wall, an inverted frusto-conical bottom having a central opening therein, said bottom sloping downwardly and inwardly from said side wall to said opening, a pipe having open upper and lower ends, said pipe being joined to said frusto-conical bottom adjacent said opening with said upper end of said pipe being in communication with the interior of said hopper through said opening, a frusto-conically shaped housing in communication with the lower end of said pipe and extending outwardly and downwardly therefrom, said housing including a circular bottom having a pair of apertures therein, door means in said hopper for introducing seeds into said hopper, gas supply means for supplying gas under pressure, conduit means leading from said gas supply means into the interior of said hopper and directed downwardly through said pipe to blow seeds therethrough into said frusto-conical housing, a pair of nozzles respectively leading from said apertures for directing the seeds onto the ground, valve means in said pipe operable between open and closed positions for controlling the flow of seeds and gas through said pipe, and by-pass pipe means leading from the interior of said hopper to a place in said seeding device downstream of said valve means for by-passing the gas when said valve means is closed.

4. A seeding device for mounting on a tractor and the like comprising an enclosed hopper for containing seeds, said hopper including means for funneling the seeds to an area in said hopper, a pipe of smaller diameter than said hopper and having opposite open ends, seed distributing means having a plurality of circumferentially spaced apertures therein, a plurality of flexible tubes leading from said apertures and terminating in laterally spaced open ends, a conically shaped deflector mounted adjacent said apertures with said apertures being disposed outwardly of said deflector, said pipe leading from adjacent said area towards said deflector, gas supply means for supplying gas under pressure, conduit means leading from said gas supply means to the interior of said hopper adjacent said area for directing the gas and the seeds in said area through said pipe against said deflector where the seeds are deflected through said apertures, and valve means in said pipe for valving the flow of air and seed through said apertures.

References Cited by the Examiner

UNITED STATES PATENTS

| | | | |
|---|---|---|---|
| 1,202,439 | 10/16 | Scott | 222—485 |
| 1,282,697 | 10/18 | Johnson | 302—28 |
| 1,769,763 | 7/30 | Wood | 302—28 |
| 1,871,853 | 8/32 | Kennedy | 302—28 |
| 2,123,537 | 7/38 | Marr | 302—53 |
| 2,648,466 | 8/53 | Baur | 302—53 |
| 2,668,636 | 2/54 | Martin | 222—193 X |
| 2,696,933 | 12/54 | Barclay | 302—53 |

LOUIS J. DEMBO, *Primary Examiner.*

ANDRES H. NIELSEN, *Examiner.*